J. C. CHAPMAN.

STOP-COCK.

No. 6,922. Reissued Feb. 15, 1876.

WITNESSES:

John R. Heard.

W. H. Eldredge

INVENTOR:

John C. Chapman.

by Albert Andrews.

atty.

UNITED STATES PATENT OFFICE.

JOHN C. CHAPMAN, OF CAMBRIDGEPORT, ASSIGNOR, BY MESNE ASSIGNMENTS, TO THE CHAPMAN VALVE MANUFACTURING COMPANY, OF BOSTON, MASSACHUSETTS.

IMPROVEMENT IN STOP-COCKS.

Specification forming part of Letters Patent No. 94,563, dated September 7, 1869; reissue No. 6,922, dated February 15, 1876; application filed June 28, 1875.

*To all whom it may concern:*

Be it known that I, JOHN C. CHAPMAN, of Cambridgeport, in the county of Middlesex and State of Massachusetts, have invented certain new and useful Improvements in Valves or Stop-Cocks; and I do hereby declare that the following is a full, clear, and exact description thereof, that will enable others skilled in the art to which it appertains to make and use the same, reference being had to the accompanying drawings and to the letters of reference marked thereon, which form a part of this specification, in which—

Figure 1:
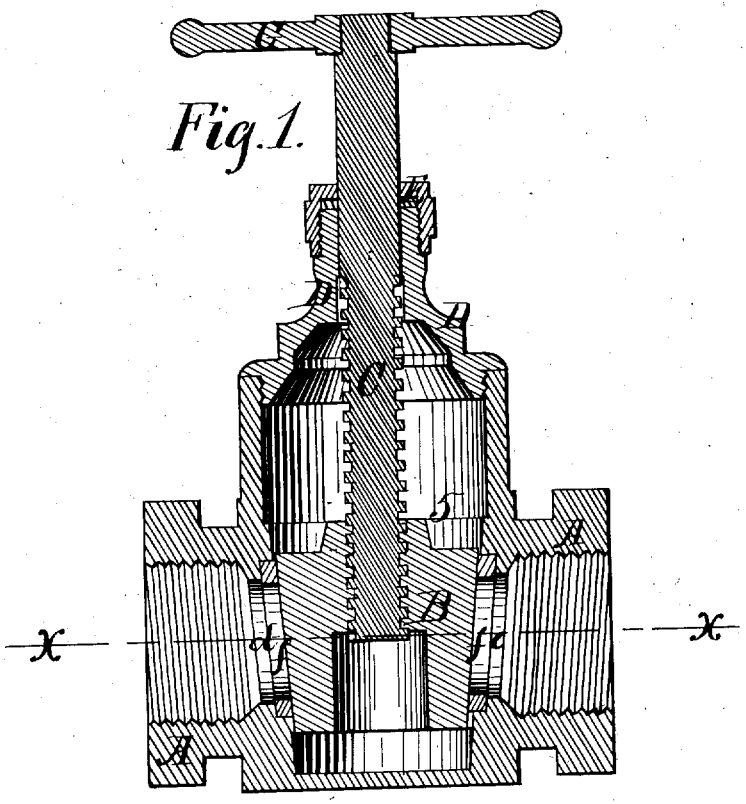
Figure 2:
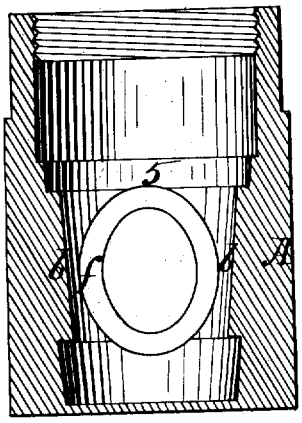
Figure 3:
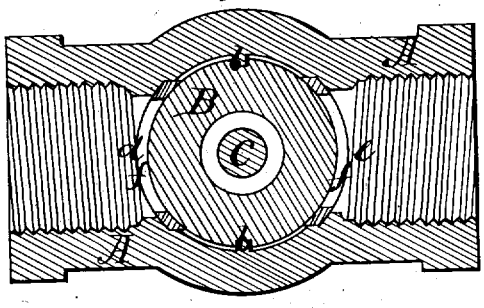

Figure 1 represents a central longitudinal section through my improved valve or stop-cock. Fig. 2 represents a section through the center of the shell of the same. Fig. 3 represents a transverse section through the valve on the line *x x* of Fig. 1.

My invention has for its object to improve the construction of valves or stop-cocks, so that the grinding hitherto required to render them light may be dispensed with, whereby I am enabled to produce a superior article at a much less cost than heretofore.

My invention consists in a conical or wedge-shaped plug that slides within a shell, in combination with a packing of Babbitt or soft metal located at the junction of the plug and its shell, at the inlet and outlet openings. I prefer to locate the Babbitt or soft metal packing in the shell for smaller valves, as shown in the drawing.

To enable others skilled in the art to understand and use my invention, I will proceed to describe the manner in which I have carried it out:

In the said drawings, A is the body or shell of the valve, having a straight, unobstructed passage through it which is closed by a tapering plug, B, which slides within the portion 5 of the shell. This plug B is advanced and withdrawn by a screw-shaft, C, which passes through it, the outer portion of the shaft above the screw-thread passing through the cap D and stuffing-box E, and, at its extremities, a hand-wheel, G, by which it is revolved. *b b* are ribs or projections on the interior of the shell, which fit into grooves in the plug B, the object of the ribs and grooves being to prevent the plug from turning while being moved by the screw-shaft C. Around the inlet and outlet openings *d e*, on the interior of the shell A, are recesses, which are filled with Babbitt or other soft metal *f*, so as to form seats or packings for the plug, the soft metal yielding and conforming exactly to the shape of the plug, thereby insuring a perfectly tight joint without the necessity of grinding the bearing-surfaces, as has been heretofore necessary in a stop-cock provided with a plug and a straight unobstructed passage, and consequently I am enabled to furnish a simple and reliable stop-cock or valve at a greatly-reduced cost.

It will be seen that in the above-described stop-cock there is no liability of leakage being caused by the wear of the plug or shell, both being tapered; the soft-metal packing will adapt itself to the form and inequalities of the plug, so as always to insure a tight joint when the valve is closed. The plug, as well as the shell, are, however, exposed to very little wear, as the one leaves the seat or contact of the other as soon as the plug is raised to open the valve. Instead of the sliding plug B being operated by a screw, as above described, it may be moved by means of a lever attached to the spindle C. This latter method would be found well adapted for gas-cocks. In lieu of the plug B being made in the form of a frustum of a cone, it may be made as a tapering wedge of any suitable section, the shape of the interior of the shell being made to conform thereto.

What I claim as my invention, and desire to secure by Letters Patent, is—

The tapering plug B, applied to and sliding within the shell A, in combination with Babbitt or soft metal packing, located at the junction between the shell and plug at the inlet and outlet openings, for the purpose set forth and described.

In testimony that I claim the foregoing, I have hereunto set my hand.

JOHN C. CHAPMAN,

By THE CHAPMAN VALVE MANF. CO.,

JOHN H. BLAKE, *President.*
JOHN T. LANGFORD, *Treasurer.*

Witnesses:
ALBAN ANDREN,
W. F. BROWN.